(12) United States Patent
Jones et al.

(10) Patent No.: US 8,806,469 B2
(45) Date of Patent: Aug. 12, 2014

(54) RUNTIME CODE REPLACEMENT

(75) Inventors: Gareth E. Jones, Winchester (GB); James Thomas, Newbury (GB)

(73) Assignee: International Business Machines Corporation, Armonk, NY (US)

( * ) Notice: Subject to any disclaimer, the term of this patent is extended or adjusted under 35 U.S.C. 154(b) by 12 days.

(21) Appl. No.: 13/357,301

(22) Filed: Jan. 24, 2012

(65) Prior Publication Data
US 2012/0216184 A1 Aug. 23, 2012

(30) Foreign Application Priority Data

Feb. 22, 2011 (EP) ..................................... 11155415

(51) Int. Cl.
G06F 9/445 (2006.01)
(52) U.S. Cl.
USPC ........................................... 717/168; 717/178
(58) Field of Classification Search
None
See application file for complete search history.

(56) References Cited

U.S. PATENT DOCUMENTS

| 7,127,707 | B1 * | 10/2006 | Mishra et al. ................. 717/137 |
| 7,305,672 | B2 | 12/2007 | Vincent |
| 7,480,699 | B2 * | 1/2009 | Alam et al. .................... 709/217 |
| 7,810,087 | B2 | 10/2010 | O'Brien |
| 2005/0268297 | A1 * | 12/2005 | Kovachka-Dimitrova et al. ............................ 717/171 |
| 2008/0120595 | A1 | 5/2008 | O'Farrell et al. |
| 2009/0119158 | A1 | 5/2009 | Chen et al. |

FOREIGN PATENT DOCUMENTS

| CN | 101807204 A | 8/2010 |
| CN | 101916194 A | 12/2010 |
| WO | WO 2010/103247 A1 | 9/2010 |

OTHER PUBLICATIONS

PCT Application PCT/IB2012/050735, International Search Report and Written Opinion dated Jun. 14, 2012 (7 pages).

* cited by examiner

*Primary Examiner* — Chuck Kendall
(74) *Attorney, Agent, or Firm* — Marcia L. Doubet

(57) ABSTRACT

Runtime code replacement at a client-side Web application is provided, and preferably comprises: determining that source code of a Web application has been updated at a server; retrieving the updated source code; and replacing existing runtime code at a running client-side Web application with the updated source code. Replacing existing runtime code may replace live objects in a memory of a Web browser on which the client-side Web application is running, without requiring a restart of the client-side application.

15 Claims, 7 Drawing Sheets

300
Loader:

```
function onLoad() {
    window.setInterval(function () {
        var scripts = document.getElementsByTagName("script"),i;
        for (i = 0; i < scripts.length; i += 1) {
            var oldScript = scripts[i],newScript;
            document.body.removeChild(oldScript);
            newScript = document.createElement("script");
            newScript.src = oldScript.src;
            document.body.appendChild(newScript);
            }
        }, 1000);
    }
    if (document.readyState === "complete") {
        onLoad();
    } else {
        window.addEventListener("load", onLoad, false);
    }
}
```

FIG. 3A

330
Module:

```
function onLoad() {
    document.getElementById("button").onclick = function (event) {
        document.getElementById("version").innerHTML = "1";
    };
    return true;
}
if (document.readyState === "complete") {
    onLoad();
} else {
    window.addEventListener("load", onLoad, false);
}
```

FIG. 3B

Loader: 400

```
var   loader,
      modules = {};
function updateModule(name, newModule) {
      var module = modules[name].module;
      for (property in module.prototype) {
            delete module.prototype[property];
      }
      for (property in newModule.prototype) {
            if (newModule.prototype.hasOwnProperty(property)) {
                  module.prototype[property] = newModule.prototype[property];
            }
      }
} function updateModules() {
      var oldNode;
      for (name in modules) {
            if (modules.hasOwnProperty(name)) {
                  oldNode = modules[name].node;
                  document.body.removeChild(oldNode);
                  modules[name].node = document.createElement("script");
                  modules[name].node.src = oldNode.src;
                  document.body.appendChild(modules[name].node);
            }
      }
};
window.setInterval(updateModules, 1000);
```

FIG. 4A

```
loader = {
    define: function (name, module) {
        if (modules[name]) {
            if (modules[name].module) {
                updateModule(name, module);
            } else {
                modules[name].module = module;
                modules[name].callback(module);
            }
        }
    },
    require: function (name, callback) {
        var node = document.createElement("script");
        modules[name] = {
            node: node,
            callback: callback
        };
        node.src = name + ".js";
        document.body.appendChild(node);
    }
};
```

FIG. 4A
(cont'd)

Main 430

```
loader.require("MyObject", function (MyObject) { function onLoad() {
        var myObject = new MyObject(),
            button = document.getElementById("button");
        button.addEventListener(
            "click",
            function (event) {
                var version = document.createElement("div");
                version.innerHTML = myObject.getVersion();
                button.parentNode.insertBefore(version
                button.nextSibling);
            },
            false);
    } if (document.readyState === "complete") {
        onLoad();
    } else {
        window.addEventListener("load", onLoad, false);
    }

460
MyObject

```
loader.define("MyObject", (function () {
    var MyObject = function () {};
    MyObject.prototype.getVersion = function () {
        return "1";
    };
    return MyObject;
}()));
```

FIG. 4C

RUNTIME CODE REPLACEMENT

BACKGROUND

The invention relates to the field of client-side execution of Web applications. In particular, the invention relates to runtime code replacement at client-side Web applications.

A common debugging technique used with the Java® language is Hot Code Replace (HCR). HCR allows a debugger to transmit new code to a Java Virtual Machine (VM), allowing modification of the code in a running application. Restarting the application is not required and therefore this approach enables problems to be fixed quickly. (Java and all Java-based trademarks and logos are trademarks or registered trademarks of Oracle Corporation and/or its affiliates in the United States, other countries, or both.)

A Java VM allows a debugger to connect directly (to a known port over transmission control protocol (TCP)) to the integrated development environment (IDE) and interact using a known application programming interface (API). The direct relationship between the Java IDE and the VM (and an associated API) allows the IDE to directly control the VM resources and hence directly replace applicable bits of code.

HCR in Java works well because the language is strongly typed, and so it is possible from within the VM to identify all objects in memory of a certain type, and hence which need to have their functionality replaced.

In Web applications, the model is usually different, in that the application running in the client browser receives each script using a one-time HTTP (Hypertext Transfer Protocol) request to the Web server, which loads the script from disk.

As Web applications become more complex, more code is executed on the client (e.g., the browser application at the client). Reloading such an application after every minor client-side code change can be tedious.

BRIEF SUMMARY

According to a first aspect of the present invention, there is provided runtime code replacement at a client-side Web application, comprising: determining that source code of a Web application has been updated at a server; retrieving the updated source code; and replacing existing runtime code at a running client-side Web application with the updated source code. The client-side Web application may be provided in JavaScript, and the replaced runtime code may comprise live objects in a memory of a Web browser on which the client-side Web application is running In a preferred embodiment, no restart of the client-side Web application or browser page refresh is required. Preferably, the source files that produced the runtime code are tracked to determine which runtime code should be replaced. Embodiments of the present invention may be provided as one or more computer program stored on a computer readable medium, system(s), and/or method(s).

BRIEF DESCRIPTION OF THE SEVERAL VIEWS OF THE DRAWINGS

Embodiments of the present invention will now be described, by way of example only, with reference to the accompanying drawings, in which:

FIGS. 3A and 3B provide code examples for a first approach disclosed herein, and FIGS. 4A-4C provide code examples for a second approach disclosed herein.

DETAILED DESCRIPTION

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

An embodiment of the present invention enables the live replacement of client-side code in a running Web application, without requiring a restart of the application or browser page refresh. The described approaches comprise: determining that code needs to be updated; retrieving the new code; and replacing existing runtime code with the newly retrieved code.

Figure 1:
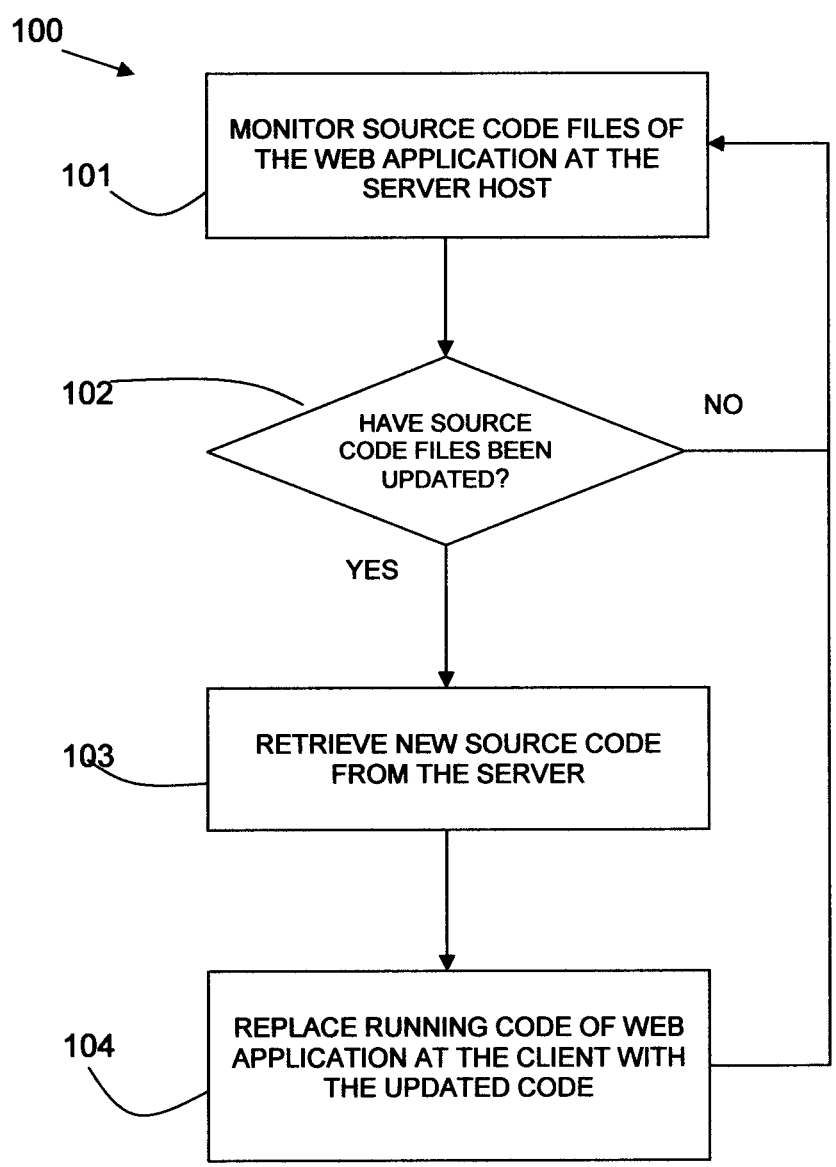
FIG. 1 is a flow diagram of a method in accordance with a preferred embodiment of the present invention.

Referring to FIG. 1, a flow diagram 100 shows an embodiment of a method carried out at a client running a Web application. The method may be carried out during development of the Web application.

Source code files at the server hosting the Web application are monitored 101. It is determined if the source code files have been updated 102. If they have not been updated, the method continues to monitor 101 the source code files.

If the source code files are updated 102, the new code is retrieved 103 from the server. The running code of the Web application at the client is replaced 104 with the updated code.

The method continues to monitor 101 further updates to the source code files at the server.

Figure 2:
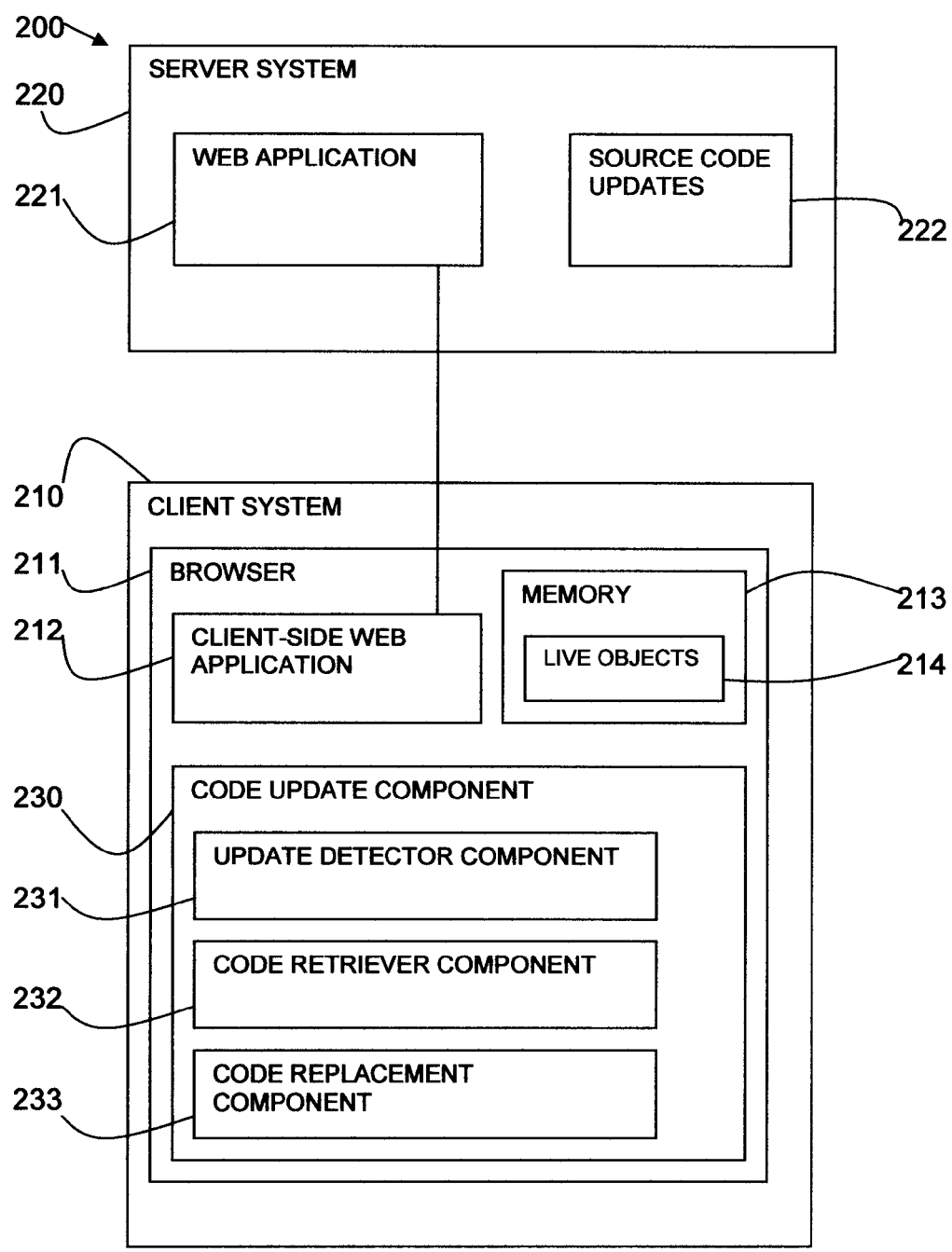
FIG. 2 is a block diagram of a system in accordance with a preferred embodiment of the present invention.

Referring to FIG. 2, a block diagram shows an embodiment of the described system 200.

A client system 210 includes a browser 211 running a client-side Web application 212. The browser 211 includes memory 213 storing live objects 214 of the client-side Web application 212.

The client-side Web application may be provided in Web application code such as JavaScript. JavaScript is an implementation of the ECMAScript language standard and is primarily used in the form of client-side JavaScript, implemented as part of a Web browser in order to provide enhanced user interfaces and dynamic websites. This enables programmatic access to computational objects within a host environment. It can be characterized as a prototype-based object-oriented scripting language that is dynamic, weakly typed, and has first-class functions.

The source code of the Web application 221 is hosted at a server system 220. The Web application 221 includes source code updates 222 provided at the server system 220. A code update component 230 is provided for updating running code in the client-side Web application 221 on the client system 210. Running client-side code of a Web application 212 needs to be replaced when the source code files on the server system 220 are updated by a developer. The code update component 230 may be local to the client system 210 and may execute from within the browser 211. As an alternative to the structure shown in FIG. 2, the code update component 230 may be part of the client-side Web application 212.

The code update component 230 includes an update detector component 231. The update detector component 231 may use various different mechanisms for detecting source code updates.

A first mechanism for the update detection uses a manual request component which can be activated manually by a developer. For example, the manual activation may occur by executing a particular JavaScript function using a debugger tool such as Firebug, or through pre-designed interaction with the Web application itself (for example, by pressing a button).

A second mechanism for the update detection is continuous client-side polling of loaded JavaScript files with requests to the server. For example, this may comprise using If-Modified-Since HTTP headers or HTTP HEAD requests to determine if the script file has been updated. This option would require network traffic that would increase with the number of scripts.

A third mechanism for the update detection is a server daemon constantly checking file modification timestamps of all scripts and communication between this daemon and the client-side Web application code. This option would require minimal network traffic but requires a server side component to always be running, plus client-side code to facilitate the communication.

The code update component 230 includes a code retriever component 232. The retrieval of the new code can be achieved using the same method that was used to retrieve it initially. For example, the retrieval may be performed by adding a <script> tag to the application's DOM (document object model) or an explicit Ajax request and JavaScript eval function.

The code update component 230 includes a code replacement component 233. There are many ways of replacing the running code within the application, with varying degrees of complexity, reliability, and development requirements. Two such approaches are discussed below with implemented code examples, and are termed "re-running scripts" and "prototype replacing" herein.

Re-Running Scripts

Re-running scripts is the more basic approach, simply involving the re-evaluating/executing of the new JavaScript. This requires very little code to enable this functionality, but does require application scripts to be written with the anticipation that that they may be executed multiple times. This approach may be used for simple circumstances.

Example code for a Loader and a Module are shown at 300 and 330, respectively, in FIGS. 3A and 3B. The meaning of this code will be readily understood by those of skill in the art.

Prototype Replacing

The prototype replacing approach allows scripts to be reloaded if they conform to some kind of module specification and generic module loading mechanism, such as that defined by CommonJS. Each relevant script is treated as a module, and all modules are reloaded when required. In the most basic case (such as that shown in the example code of FIGS. 4A-4C), the module provides a JavaScript object and when re-loaded, the previous object's prototype is replaced with the new one. This allows existing object instances to use new JavaScript code for their inherited functions.

Example code for a Loader, Main function, and MyObject function are shown at 400, 430, and 460, respectively, of FIGS. 4A-4C. The meaning of this code will be readily understood by those of skill in the art.

In both approaches, the example code demonstrates the functionality in the most basic of forms. More complexity may be incorporated.

The prior art use of JavaScript in Web applications has some problems that need to be overcome. There is limited notion of types, and hence the more complex hot replacement code approach of prototype replacing works by tracking which source files produced which modules, and hence which objects should be replaced when new code is retrieved.

Extra client-side code is provided, when using an embodiment of the present invention, which will explicitly request the new code and then replace live objects in the memory of the browser. Rather than being driven by the IDE, the code reload is driven by the application itself.

For performance, network traffic, and basic requirement reasons, an embodiment of the present invention may be used during development and not included in a production application. This could be done with a debug flag, a build option, or simply removing the functionality before release.

A client-side Web application live code replacement system may be provided as a service to a customer over a network.

Figure 5:
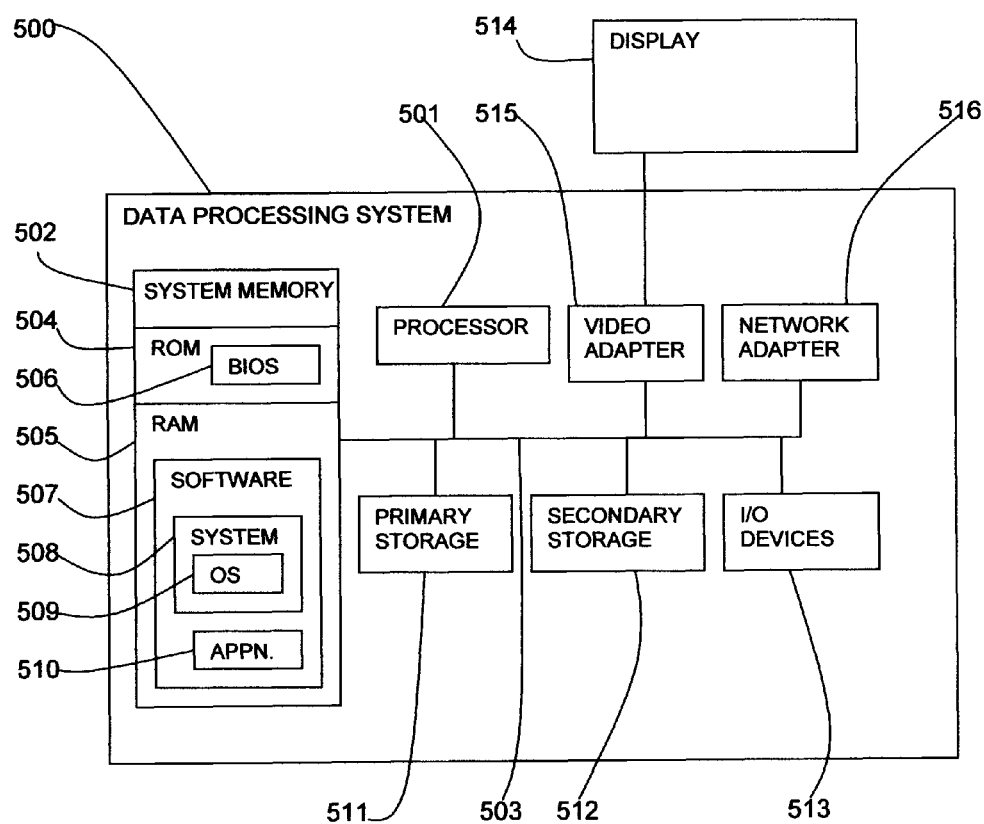
FIG. 5 is a block diagram of a computer system in which a preferred embodiment of the present invention may be implemented.

Referring to FIG. 5, an exemplary system for implementing aspects of the invention includes a data processing system 500 suitable for storing and/or executing program code, including at least one processor 501 coupled directly or indirectly to memory elements through a bus system 503. The memory elements can include local memory employed during actual execution of the program code, bulk storage, and cache memories which provide temporary storage of at least some program code in order to reduce the number of times code must be retrieved from bulk storage during execution.

The memory elements may include system memory 502 in the form of read only memory (ROM) 504 and random access memory (RAM) 505. A basic input/output system (BIOS) 506 may be stored in ROM 504. System software 507 may be stored in RAM 505, including operating system software 509. Software applications 510 may also be stored in RAM 505.

The system 500 may also include a primary storage means 511, such as a magnetic hard disk drive, and secondary storage means 512, such as a magnetic disc drive and/or an optical disc drive. The drives and their associated computer-readable media provide non-volatile storage of computer-executable instructions, data structures, program modules, and other data for the system 500. Software applications may be stored on the primary and secondary storage means 511, 512 as well as in the system memory 502.

The computing system 500 may operate in a networked environment using logical connections to one or more remote computers via a network adapter 516.

Input/output devices 513 can be coupled to the system either directly or through intervening I/O controllers. A user may enter commands and information into the system 500 through input devices such as a keyboard, pointing device, or other input devices (for example, microphone, joy stick, game pad, satellite dish, scanner, or the like). Output devices may include speakers, printers, etc. A display device 514 is also connected to system bus 503 via an interface, such as video adapter 515.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain or store the program for use by or in connection with the instruction execution system, apparatus, or device.

The medium can be an electronic, magnetic, optical, electromagnetic, or semiconductor system (or apparatus or device). Examples of a computer-readable medium include a semiconductor or solid state memory, magnetic tape, a removable computer diskette, a random access memory (RAM), a read only memory (ROM), a rigid magnetic disk, and an optical disk. Current examples of optical disks include compact disk read only memory (CD-ROM), compact disk read/write (CD-R/W), and DVD.

Improvements and modifications can be made to the foregoing without departing from the scope of the present invention.

The invention claimed is:

1. A method for runtime code replacement at a client-side Web application, the method comprising:
   determining that source script code used in a Web application running on a client browser has been updated at a server;
   sending a request from the Web application to the server to request retrieving the updated source script code used in the Web application from the server to the client;
   receiving the requested updated source script code at the client; and
   replacing an existing runtime version of the source script code used in the Web application, while the Web application continues running on the client browser, with the updated source script code without requiring a restart of the running Web application, further comprising:
      creating at least one new object, as required to implement the updated source script code;
      locating each of at least one object corresponding to the existing runtime version;
      removing any located object for which the creating did not create a corresponding new object; and
      for each remaining located object, using a new prototype of a corresponding one of the at least one new object as a replacement for an existing prototype of the located object, the new prototype determined from the updated source script code, further comprising:
         determining each of at least one property of the located object; and
         storing a copy of a value of each determined property of the located object into a corresponding property of the corresponding new object.

2. The method as claimed in claim 1, wherein the located objects and the new objects reside in a memory used by the client browser.

3. The method as claimed in claim 2, wherein no browser page refresh is required for the client browser responsive to the replacing.

4. The method as claimed in claim 1, wherein determining that source script code has been updated comprises one of:
   manually initiating the sending of the request for retrieving the updated source script code from the server;
   using polling requests to trigger the sending of the request to the server; and
   initiating the sending of the request responsive to client-side communication with a server daemon that checks file modification timestamps and determines that a more-recent version of the source script code exists.

5. The method as claimed in claim 1, wherein the source script code and the updated source script code are each encoded as a module specification in JavaScript scripting language.

6. The method as claimed in claim 1, wherein existing object instances that inherit functions from the located objects automatically inherit the functions from the new corresponding objects.

7. The method as claimed in claim 1, further comprising tracking which objects are produced by which source script code to determine which runtime version of script code should be replaced.

8. A system for runtime code replacement at a client-side Web application, the system comprising:
   a computer comprising a processor; and
   instructions which are executable, using the processor, to perform functions comprising:
      determining that source script code used in a Web application running on a client browser has been updated at a server;
      sending a request from the Web application to the server to request retrieving the updated source script code used in the Web application from the server to the client;
      receiving the requested updated source script code at the client; and
      replacing an existing runtime version of the source script code used in the Web application, while the Web application continues running on the client browser, with the updated source script code without requiring a restart of the running Web application, further comprising:
         creating at least one new object, as required to implement the updated source script code;
         locating each of at least one object corresponding to the existing runtime version;
         removing any located object for which the creating did not create a corresponding new object; and
         for each remaining located object, using a new prototype of a corresponding one of the at least one new object as a replacement for an existing prototype of the located object, the new prototype determined from the updated source script code, further comprising:
            determining each of at least one property of the located object; and
            storing a copy of a value of each determined property of the located object into a corresponding property of the corresponding new object.

9. The system as claimed in claim 8, wherein the located objects and the new objects reside in a memory used by the client browser.

10. The system as claimed in claim 8, wherein determining that source script code has been updated comprises one of:
    manually initiating the sending of the request for retrieving the updated source script code from the server;
    sending polling requests to trigger the sending of the request to the server; and
    initiating the sending of the request responsive to client-side communication with a server daemon that checks file modification timestamps and determines that a more-recent version of the source script code exists.

11. The system as claimed in claim 8, wherein the source script code and the updated source script code are each encoded as a module specification in JavaScript scripting language.

12. The system as claimed in claim 8, further comprising tracking which objects are produced by which source script code to determine which runtime version of script code should be replaced.

13. A computer program product stored on a non-transitory computer-readable medium and loadable into an internal memory of a digital computer, the computer program comprising computer-readable program code for causing the digital computer to perform:
- determining that source script code used in a Web application running on a client browser has been updated at a server;
- sending a request from the Web application to the server to request retrieving the updated source script code used in the Web application from the server to the client;
- receiving the requested updated source script code at the client; and
- replacing an existing runtime version of the source script code used in the Web application, while the Web application continues running on the client browser, with the updated source script code without requiring a restart of the running Web application, further comprising:
  - creating at least one new object, as required to implement the updated source script code;
  - locating each of at least one object corresponding to the existing runtime version;
  - removing any located object for which the creating did not create a corresponding new object; and
  - for each remaining located object, using a new prototype of a corresponding one of the at least one new object as a replacement for an existing prototype of the located object, the new prototype determined from the updated source script code, further comprising:
    - determining each of at least one property of the located object; and
    - storing a copy of a value of each determined property of the located object into a corresponding property of the corresponding new object.

14. The computer program product as claimed in claim 13, further comprising tracking which objects are produced by which source script code to determine which runtime version of script code should be replaced.

15. The computer program product as claimed in claim 13, wherein:
- the located objects and the new objects reside in a memory used by the client browser; and
- no browser page refresh is required for the client browser responsive to the replacing.

\* \* \* \* \*